Figure 5:
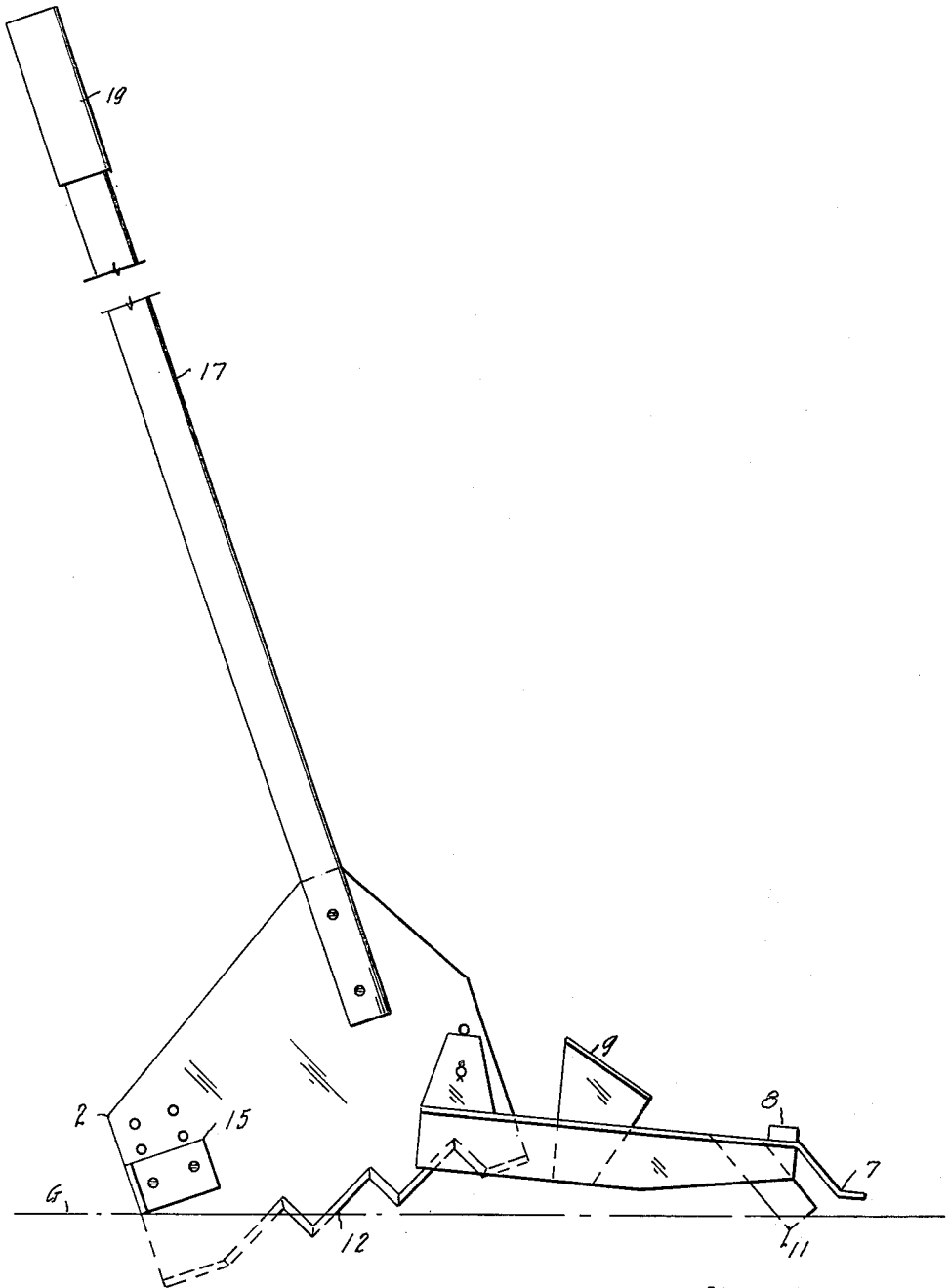

Oct. 16, 1962     A. KEINATH     3,058,530
LAWN EDGER
Filed July 21, 1961     2 Sheets-Sheet 1
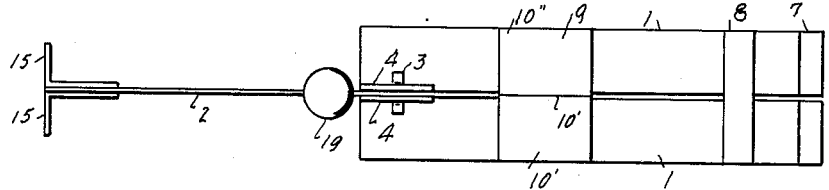
FIG. 1
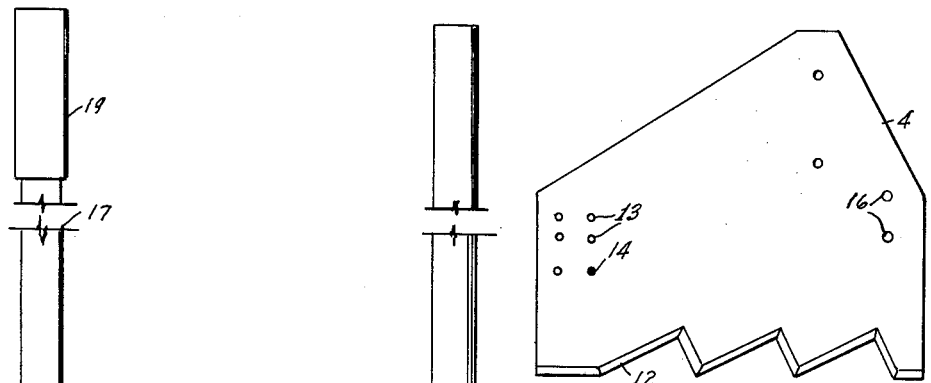
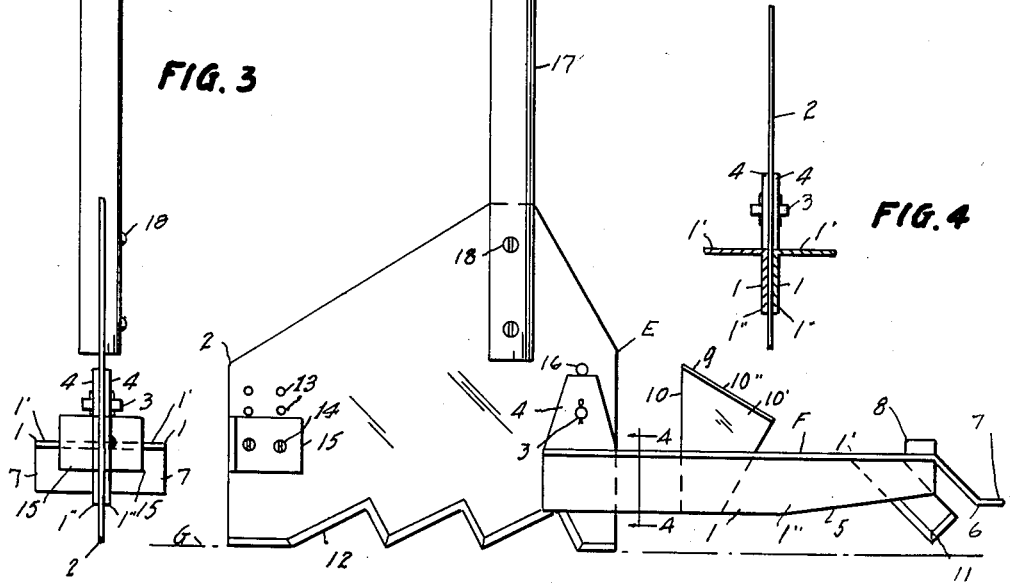
ALVIN KEINATH
Inventor

United States Patent Office 3,058,530
Patented Oct. 16, 1962

3,058,530
LAWN EDGER
Alvin Keinath, 7526 N. Chautauqua, Portland, Oreg.
Filed July 21, 1961, Ser. No. 126,815
4 Claims. (Cl. 172—13)

My invention relates to a lawn edger, a tool for trimming grass extending over a walk or curb.

The principal objective of my invention is to provide a tool for such work which one may operate standing up.

Another objective is to be able to do the edging more expeditiously.

A still further objective is to provide a cheap simple tool of few parts.

The structure of my edging tool is illustrated in the accompanying drawings of which FIG. 1 is a plan view, FIG. 2 is a side elevation, FIG. 3 is an end elevation, FIG. 4 is a vertical section on the line 4—4 of FIG. 2, FIG. 5 is a side elevation showing the tool humped prior to forward movement, and FIG. 6 is a side elevation of a cutter blade.

Throughout the drawings and the specifications similar numerals refer to similar parts.

The basic idea behind my invention may be designed in many ways without departing from the essence of said idea. For purpose of illustration I shall describe the tool made up in part of standard sections that have proved out in practice.

The edger E has a frame F made up of two 1½″ x 1½″ x ⅛″ angles 1 about 9½″ long welded (bolted or riveted) together at one end thereof in spaced apart relation and adapted to receive between them at the opposite end thereof a cutter blade 2 formed of 9/32″ saw plate which is pivotally connected by a bolt or pivot pin 3 mounted in the upstanding ears 4 welded to the horizontal legs 1′ of the frame angles 1. The vertical leg 1″ of said frame angles 1 is relieved as shown at 5 for a purpose to be later stated. This vertical leg 1″ is shorter than the horizontal legs 1′ which is extended to provide the foot piece 6 which depends at about 45 degrees from the horizontal and terminates in the pad 7 parallel to the horizontal legs 1′.

At the secured together end of the frame angles 1 is positioned the heel stop 8 which is rectangular in form and about 5/16″ high. Forward of the heel stop is the foot rest 9 formed of two oppositely disposed angles 10 of 1/16″ stock whose vertical legs 10′ are so positioned between the vertical legs 1″ of the frame angles 1 as to give a 30 degree slope to the normally horizontal legs 10″ of said angles 10—their slope being toward the heel stop 8. Also serving as a spacer for the angles 1 is the back stop 11 rectangular in form which depends at a 45 degree angle about 1″ below the foot piece 6 as clearly shown in FIG. 2.

The cutter blade 2 as shown in FIG. 2 extends forward of and below the bottom line of the frame angles 1 about 1″. I have made this cutting blade with a straight cutting face but I prefer to make it with serrations or teeth 12 as shown in FIGS. 2 and 6 where tough tufts of grass are common. These serrations or teeth have a 2¼″ pitch and are about ¾″ deep—both faces of the teeth being ground from both sides toward the center. A 30 degree slope is given the bottom face of said teeth with the back slope at right angles thereto.

The cutter blade 2 is about 9″ long and 7½″ high. At the outer end of said blade 2 are a series of holes 13 provided for the bolts 14 which hold the angle stops 15 to the cutter blade 2, said stops 15 serving to fix the depth the cutter blade 2 may enter the ground G when tilted as shown in FIG. 5. Further regulation of the cutter blade 2 is secured the operating handle 17 which is shown holes 16 are provided in the cutter blade 2. To the cutter blade 2 is secured the operating handle 17 which is shown to be a length of ¾″ pipe slit to straddle said cutter blade and fastened thereto by the screws 18. A rubber grip 19 terminates the handle 17. The handle might be welded to the cutter blade 2 but this makes for awkward shipment and for grinding the blade teeth 12.

The operation of my lawn edger follows the action of a worm moving along. The worm holds its head portion and humps its middle portion by drawing its rear portion forward then holds its rear portion and moves its head portion forward as it lowers its middle portion.

The operation of my lawn edger follows:

My device is first placed in the relationship to the ground G as shown in FIG. 2. The upper end of the operating handle 17 is then moved froward which causes the front end of the cutter blade 2 to be lowered until the stop angles 15 thereon come into contact with the ground G at which time the rear end of the cutter blade 2 will be raised as shown in FIG. 5. In order to reach the position shown in FIG. 5 the foot pad 7 and the back stop 11 will be moved forward. Upon the backward or return movement of the operating handle 17 the foot pad 7 and the back stop 11 will dig in as the blade 2 is moved forward from 3″ to 4″ to the horizontal position shown in FIG. 2. The digging in of the members 7 and 11 is facilitated by a slight pressure of the operator's foot as he holds his shoe heel against the heel stop 8 while the ball of his foot rests upon the foot rest 9. As the device buckles or jackknifes it has a more unobstructed movement due to the relieving of the frame angles 1 at 5.

Since my lawn edger may be built of standard sections as shown or designed to use sand or extruded castings I do not limit my invention to the exact design shown but extend it to all that comes fairly within the scope of the appended claims.

I claim:

1. A lawn edger having in combination, a thin substantially rectangular blade having a bottom cutting edge; an operating lever extending upwardly above the top edge of said blade to which it is secured rearwardly of the blade's vertical median line; a rearwardly extending elongated frame hingedly connected to the blade rearwardly of said vertical median line and adjacent the blade's horizontal median line; a backstop secured adjacent the rear end of the frame and depending therefrom and adapted to be imbedded in the ground; and a front stop secured to the front edge of the blade and above its cutting edge to limit the distance the cutting blade may enter the ground when the blade is advanced by moving the top end of the operating lever to the rear.

2. The structure of claim 1 in which the front stop and the hinged connection of the frame may be raised or lowered to meet conditions encountered.

3. A lawn edger having in combination, a thin substantially rectangular blade having a bottom cutting edge; an elongated operating lever ridgedly secured to said blade rearwardly of the cutting blade's vertical median line and extending upwardly above the top edge of said cutting blade; a front stop positioned adjacent the front edge of the cutting blade to limit the depth that the cutting blade may enter the ground; an elongated frame member extending rearwardly of the cutting blade; a hinged connection between said frame member and the cutting blade, which connection constitutes the fulcrum point through which the line of force passes from the operating lever to the forward bottom corner of the cutting blade in the manner of a bent lever of the first class; and a stop depending from the rear end of the frame member and adapted to be imbedded in the ground when downward pressure is applied to the frame member by the edger operator.

4. The structure of claim 3 in which the front stop and the hinged connection of the frame may be raised or lowered to meet conditions encountered.

References Cited in the file of this patent

UNITED STATES PATENTS

| | | |
|---|---|---|
| 1,800,905 | Rieff | Apr. 14, 1931 |
| 2,615,246 | Littig | Oct. 28, 1952 |
| 2,624,938 | Davis | Jan. 13, 1953 |
| 2,844,084 | Greenland | July 22, 1958 |
| 2,896,389 | Dupres | July 28, 1959 |
| 2,910,127 | Saunders | Oct. 27, 1959 |

UNITED STATES PATENT OFFICE
CERTIFICATE OF CORRECTION

Patent No. 3,058,530

October 16, 1962

Alvin Keinath

It is hereby certified that error appears in the above numbered patent requiring correction and that the said Letters Patent should read as corrected below.

Column 1, line 71, strike out "secured the operating handle 17 which is shown" and insert instead -- through the pivot pin 3 for which a series of --.

Signed and sealed this 2nd day of April 1963.

(SEAL)
Attest:

ESTON G. JOHNSON

Attesting Officer

DAVID L. LADD
Commissioner of Patents